United States Patent [19]

Mukohjima et al.

[11] Patent Number: 4,831,305
[45] Date of Patent: May 16, 1989

[54] VIBRATION WAVE MOTOR

[75] Inventors: Hitoshi Mukohjima; Akira Hiramatsu, both of Yokohama, Japan

[73] Assignee: Canon Kabushiki Kaisha, Tokyo, Japan

[21] Appl. No.: 143,238

[22] Filed: Jan. 7, 1988

Related U.S. Application Data

[63] Continuation of Ser. No. 715,415, Mar. 25, 1985, abandoned.

[30] Foreign Application Priority Data

Apr. 2, 1984 [JP] Japan ................................. 59-65402
Apr. 2, 1984 [JP] Japan ................................. 59-65403

[51] Int. Cl.⁴ ............................................ H01L 41/08
[52] U.S. Cl. ................................. 310/323; 310/328; 310/357
[58] Field of Search ..................... 310/323, 328, 357

[56] References Cited

U.S. PATENT DOCUMENTS

| | | | |
|---|---|---|---|
| 4,484,099 | 11/1984 | Kawai et al. | 310/323 X |
| 4,491,401 | 1/1985 | Inaba et al. | 354/271.1 |
| 4,495,432 | 1/1985 | Katsuma et al. | 310/328 |
| 4,504,760 | 3/1985 | Yamamoto et al. | 310/323 |
| 4,513,219 | 4/1985 | Katsuma et al. | 310/328 |
| 4,560,263 | 12/1985 | Katsuma et al. | 310/328 X |

Primary Examiner—Patrick R. Salce
Assistant Examiner—Emanuel Todd
Attorney, Agent, or Firm—Fitzpatrick, Cella, Harper & Scinto

[57] ABSTRACT

A movable member of a vibration wave motor is driven by a twist component of an off-plane travelling vibration wave generated by a vibration member in a resonance vibration mode.

11 Claims, 5 Drawing Sheets

VIBRATION WAVE MOTOR

This application is a continuation of application Ser. No. 715,415, filed Mar. 25, 1985, now abandoned.

BACKGROUND OF THE INVENTION

1. Field of the Invention

The present invention relates to an improvement in the structure of a vibration wave motor driven by a travelling vibration wave.

2. Description of the Prior Art

A vibration wave motor transduces a vibration motion created by application of a periodic voltage to electrostrictive elements to a rotational motion or a linear motion. Because it does not require windings as opposed to a conventional electromagnetic motor, it is simpler and smaller in structure and produces a high torque at a low rotating speed.

FIGS. 1 and 2 show a principle of drive in a prior art vibration wave motor. FIG. 1 illustrates generation of the surface wave in the motor. Numeral 1 denotes a vibration member, and numerals 2a and 2b denote electrostrictive elements which are bonded or welded to the vibration member 1 (usually made of metal) and arranged on one side of the vibration member 1 with a spatial phase difference of $\lambda/4$ therebetween.

The vibration member 1 is used as one electrode for the electrostrictive elements 2a and 2b and an A.C. voltage $V = V_0 \sin \omega t$ is applied to the electrostrictive element 2a from A.C. power supply 3a while an A.C. voltage $V = V_0 \sin (\omega t \pm \pi/2)$ having a phase difference of $\lambda/4$ is applied to the electrostrictive element 2b, where signs "+" and "−" are selected by a phase shifter 3b in accordance with a direction of movement of the movable member 5. Let us assume that the sign "−" is selected and the voltage $V = V_0 \sin (\omega t - \pi/2)$ is applied to the electrostrictive element 2b.

When only the electrostrictive element 2a is vibrated by the voltage $V = V_0 \sin \omega t$, a vibration by a standing wave is generated as shown in FIG. 1(a), and when only the electrostrictive elements 2b is vibrated by the voltage $V = V_0 \sin (\omega t - \pi/2)$, a vibration by a standing wave is generated as shown in FIG. 1(b). When the two A.C. voltages having the phase difference therebetween are simultaneously applied to the electrostrictive elements 2a and 2b, the surface wave travels.

FIGS. 1(A), 1(B), 1(C) and 1(D) show the surface waves at times $t = 2n\pi/\omega$, $t = \pi/2\omega + 2n\pi/\omega$, $t = \pi/\omega + 2n\pi/\omega$ and $t = 3\pi/2\omega + 2n\pi/\omega$, respectively, and the wavefront travels in the x-direction.

Such a travelling surface wave includes a longitudinal wave and a lateral wave. Looking at a mass point A of the vibration member 1 as shown in FIG. 2, a longitudinal amplitude u and a lateral amplitude w make a rotating elliptic motion.

A movable member 5 is press-contacted to the surface of the vibration member 1 and it contacts only to an apex of the vibration member. (Actually, it contacts an area having a definite width.) Accordingly, the vibration member 5 is driven by the longitudinal amplitude component u of the elliptic motion of the mass points A, A; ... at the apex and it moves in an arrow direction N.

When the phase of the voltage is shifted 90° by the 90° phase shifter, the surface wave travels in −x direction and the movable member 5 moves in the opposite direction to the direction N.

A structure of a rotary vibration wave motor which causes a rotational motion by the above vibration wave motor is shown in FIG. 3, and a sectional view thereof is shown in FIG. 4. Numeral 11 denotes an elastic vibration member made of metal; numeral 12 denotes an electrostrictive element coupled to the vibration member 11; numeral 15 denotes a movable member press-contacted to the vibration member 11; numeral 16 denotes a rotary disc (rotary shaft) which is rotated with the movable member 15; numeral 17 denotes a vibration absorber which supports the vibration member 11; and, numeral 18 denotes a stator.

A periodic voltage is applied to an electrostrictive element 12 similar to the electrostrictive element 2 in structure from an external power supply, and a frequency of the periodic voltage is selected to a drive frequency at which the vibration member 11 resonates. Thus, a travelling wave is generated in the vibration member 11, and a frictional force is applied by the travelling wave generated in the vibration member 11 to a movable member 15 which is press-contacted to the vibration member 11 by a spring 20 through a thrust bearing 19 so that the rotary shaft 16 coupled to the movable member 15 is rotated. A fixed cover 21 is fixed to the stator 18 by bolts 22, and the vibration absorber 17 is inserted between the electrostrictive element 12 and the stator 18 to prevent supersonic vibration of the vibration member 11 from propagating to the stator 18.

However, because the vibration member 11 is of ring shape, when this vibration wave motor rotates, the vibration member 11 not only vibrates in a direction normal to the ring plane in the off-plane vibration mode shown in FIG. 2 but also twists in a circumferential direction of the ring as shown in FIG. 5. Thus, both the bending vibration normal to the ring plane and twisting along the circumference of the ring are generated. The vibration wave motor utilizes the travelling wave by the bending vibration generated normally to the ring plane to drive the movable member 15. However, it does not effectively utilize the travelling wave by the twist component of the vibration generated in the circumferential direction of the ring.

Accordingly, the energy of the twist component of the vibration generated in the circumferential direction is lost, and the efficiency of the vibration wave motor is lowered.

As shown in FIG. 5, the amplitude of the twist component of the vibration in the circumferential direction of the ring is larger at a radially outer point than at a radially inner point. Accordingly, a magnitude of the elliptic motion of the mass point on the surface of the vibration member 11 is larger at the radially outer point than at the radially inner point. Since the travelling wave by the bending vibration normal to the ring plane is utilized, the movable member 15 on the vibration member 11 primarily contacts the radially outer area of the ring and does not contact the radially inner area.

Thus, the contact area between the movable member 15 and the vibration member 11 is substantially reduced, the propagation efficiency of the travelling wave of the vibration member 1 to the movable member 15 is lowered and a sufficient output is not produced.

SUMMARY OF THE INVENTION

It is an object of the present invention to provide a vibration wave motor having an improved efficiency.

It is another object of the present invention to provide a ring-shaped vibration wave motor which effectively utilizes the twist component of an off-plane vibration generated in a ring-shaped vibration member to contribute to the movement of the vibration member.

It is a further object of the present invention to provide a ring-shaped vibration wave motor in which the vibration member is contacted to an inner circumferential plane or an outer circumferential plane of the ring-shaped vibration member to allow effective utilization of the twist component of the off-plane vibration.

It is still another object of the present invention to provide a method for arranging electrostrictive elements to increase the amplitude of the off-plane vibration of the ring-shaped vibration member.

DETAILED DESCRIPTION OF THE PREFERRED EMBODIMENTS

Figure 6:
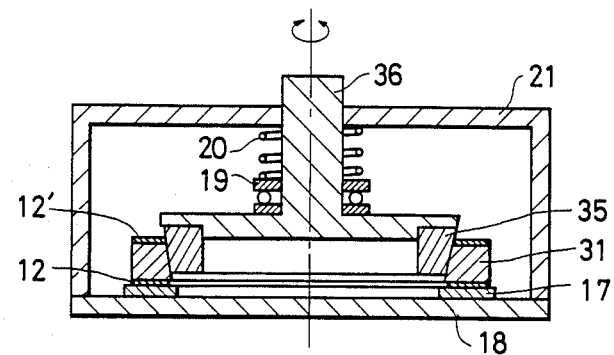
FIG. 6 is a sectional view of a first embodiment of a vibration wave motor of the present invention.

FIG. 6 is a sectional view of a first embodiment of the vibration wave motor of the present invention. Numeral 31 denotes a vibration member, numeral 35 denotes a movable member, and numeral 36 denotes a rotary disc (rotary shaft). The other elements which are similar to those shown in FIG. 4 are designated by the like numerals.

Figure 7A:
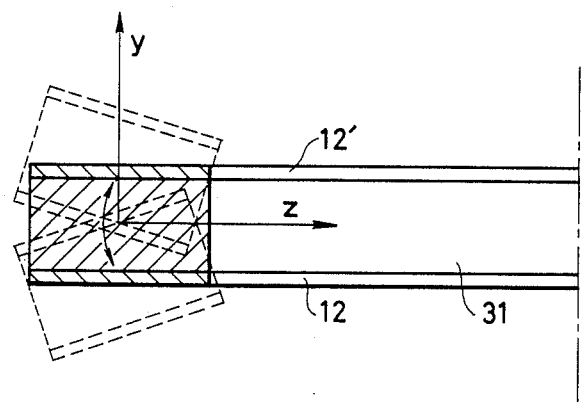
FIGS. 7(A) and 7(B) illustrate a principle of drive in the present invention.
Figure 7B:
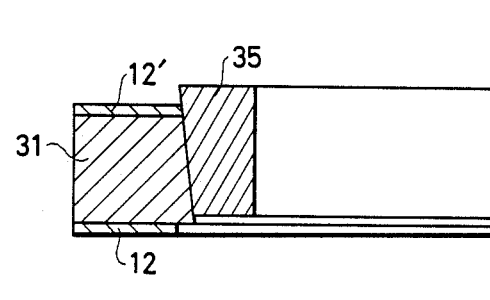

FIGS. 7(A) and 7(B) illustrate a principle of drive in the present invention and show sectional views of the vibration member. As shown in FIG. 7(A), the vibration member 31 and the electrostrictive elements 12 and 12' make movement as shown by broken line sections. As shown in FIG. 7(B), if the movable member 35 contacts an inner circumferential plane of the vibration member 31, a twist component of the vibration of the vibration member 31 can be utilized for the drive. In the present embodiment, the contact surface of the vibration member 31 and the movable member 35 are not perpendicular to the ring plane but oblique so that an automatic centering function is provided. By increasing the thicknesses of the movable member and the vibration member, the contact area is increased and a higher output is produced.

Figure 1:
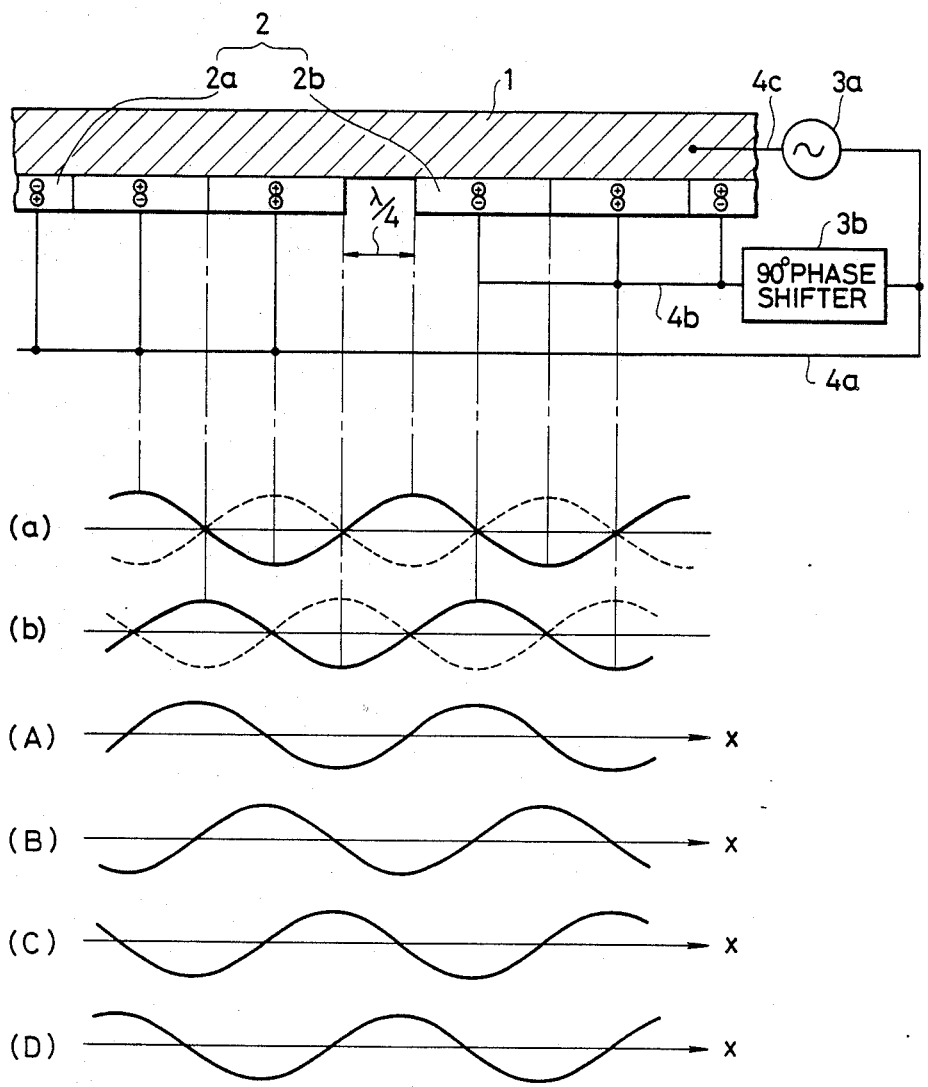
FIGS. 1 and 2 illustrate a principle of drive of a vibration wave motor.
Figure 3:
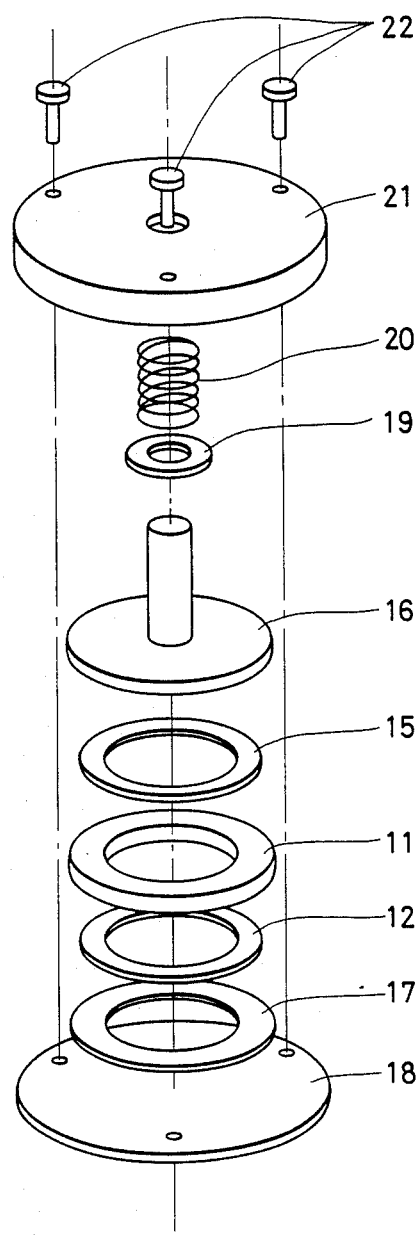
FIG. 3 is a developed perspective view of a structure of a prior art rotary vibration wave motor.
Figure 2:
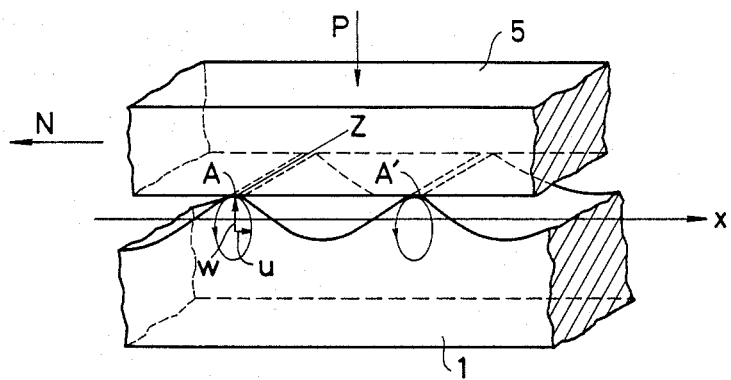
Figure 4:
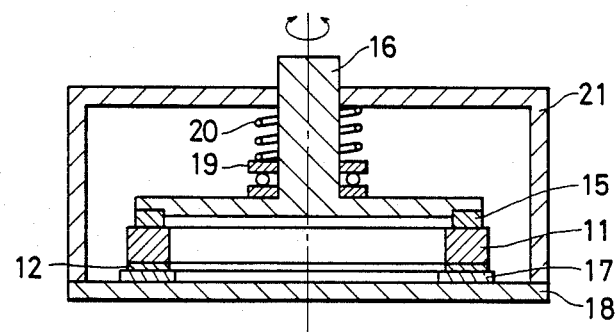
FIG. 4 is a sectional view of the rotary vibration wave motor shown in FIG. 3.
Figure 5:
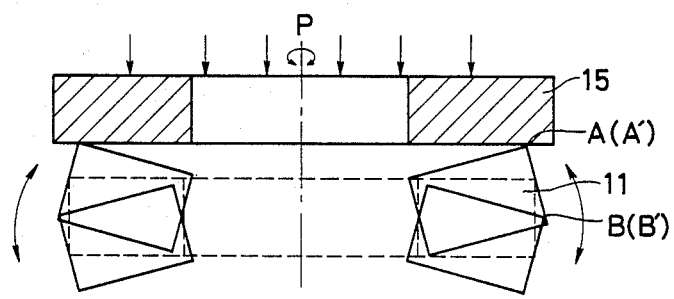
FIG. 5 is a sectional view for illustrating a twist vibration generated circumferentially of a ring plane of the vibration wave motor.

As shown in FIG. 4, in the prior art vibration wave motor, the movable member 15 is arranged on the upper surface of the vibration member 11 and the electrostrictive element 12 is arranged on the lower surface of the vibration member 11. Accordingly, the vibration energy generated in the vibration member 11 is supplied from the electrostrictive element 12 arranged on only lower surface of the vibration member 11.

In the present invention, since the movable member 35 is contacted to the inner circumferential plane of the vibration member 31, the twist component of the vibration of the vibration member 31 can be applied to the movable body 35. By arranging two electrostrictive elements 12 and 12' on the upper and lower surfaces of the vibration member 31, an energy which is almost twice as large as that in the prior art vibration wave motor can be supplied to the vibration member 31 and the torque of the vibration wave motor is increased.

Figure 8A:
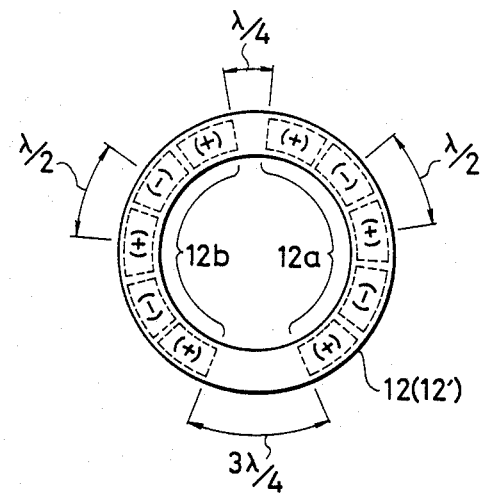
FIGS. 8(A) and 8(B) are plan views showing arrangement of electrostrictive elements 12 and 12' shown in FIGS. 7(A) and 7(B)
Figure 8B:
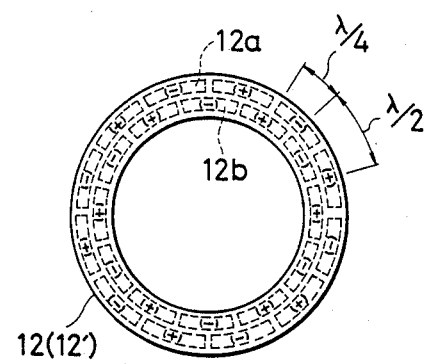

Referring to FIG. 8, the arrangement of polarization of the electrostrictive elements 12 and 12' is now explained. FIG. 8(A) shows the arrangement of the electrostrictive element 5 in the prior art motor. Numeral 12a denotes a 0°-phase pole and numeral 12b denotes a ±90°-phase pole which is displaced by $\lambda/4$. They may comprise a plurality of electrostrictive cells, or electrostrictive elements polarized so as to have a phase difference. They are arranged on both sides of the vibration member 31. The electrostrictive elements 12 and 12' should be arranged such that corresponding electrostrictive cells are arranged at the same position through the vibration member 31 as viewed in the axial direction of rotation.

Figure 7C:
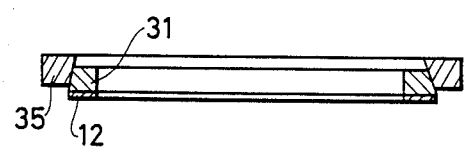
FIG. 7(C) is a sectional view of an embodiment in which a movable member 35 is contacted to an outer circumferential plane of a vibration member 31.

In the present embodiment, the area contracting the movable member 35 is on the inner circumferential plane of the vibration member 31. Alternatively, as shown in FIG. 7(C), the outer circumferential plane of the vibration member 31 may be used as the area in contact with the movable member 35. The arrangement of the electrostrictive elements is not limited to that shown in FIG. 8(A) which has been known but it may be that shown in FIG. 8(B) in which two lines of inner and outer electrostrictive elements are arranged with the phase difference of $\lambda/4$. Again, the electrostrictive elements 12 and 12' are arranged such that corresponding electrostrictive cells are arranged at the same position. In this case, since the total area of the electrostrictive elements is larger than that in FIG. 8(A), a higher vibration energy is produced.

In accordance with the present embodiment, the inner or outer circumferential plane of the vibration member is used as the contact area to the movable member and two electrostrictive elements are arranged on the opposite sides of the vibration member. Accordingly, the twist component of the vibration member which is twice as large as that in the motor having only one electrostrictive element arranged on the vibration member can be utilized for the drive. By increasing the thicknesses of the vibration member and the movable member, the contact area of the movable member and the vibration member may be increased, a higher output is produced and efficiency is improved. In the embodiment shown in FIG. 7(B), the contact area is oblique to the ring plane so that the automatic centering function is provided and a stable output with low rotation flutter output is produced.

In the following embodiment, the twist component of the vibration along the circumference of the ring, of the off-plane vibration of the vibration member 11 is not utilized to drive the movable member 15 but the electrostrictive elements are arranged to drive the movable member 11 by using the bending vibration in the ring plane.

Figure 9:
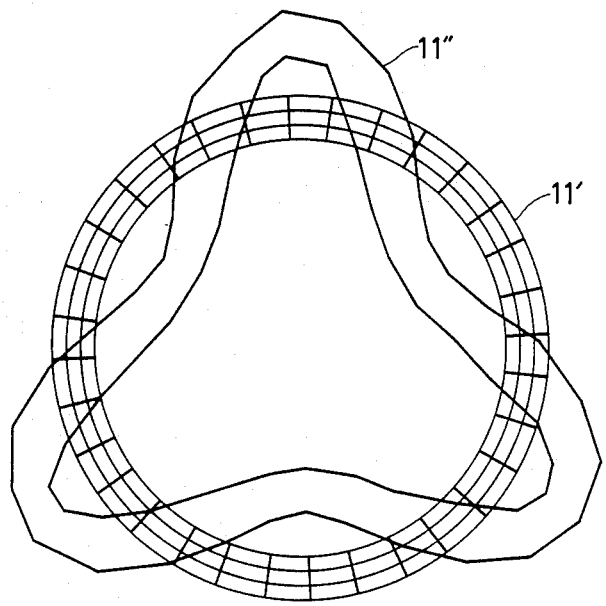
FIG. 9 is a plan view illustrating a bending vibration in a ring plane.

Referring to FIG. 9, the bending vibration in the ring plane is explained.

In FIG. 9, a specific vibration mode of the vibration member 11 in the bending vibration in the ring plane is analyzed by a definite element method. (The number of waves is three.) Numeral 11' denotes the vibration member which is drawn with small units used for analyzing by definite element method. Numeral 11" indicates that the in-plane bending vibration occurred in the vibration member 11'. Only inner and outer surfaces of the vibration member are shown in FIG. 9, the amplitude of the in-plane bending vibration is exaggerated to more clearly show the in-plane bending vibration of the vibration member 11. In order to generate the in-plane vibration, the frequency of the periodic voltage applied to the electrostrictive element 12 should be selected to a frequency f2 which is suitable to generate the in-plane vibration. The frequency f2 is given by $$f_2 = \frac{1}{2\pi} \sqrt{\frac{EI_y}{PAr^4}} \sqrt{\frac{n^2(n^2-1)^2}{n^2+1}}$$

where
A: sectional area of vibration member
E: Young's modulus
n: number of waves of vibration
r: radius of ring-shaped vibration member
Iy: sectional secondary moment on y-axis
a frequency $f_1$ which is suitable to generate the off-plane bending vibration is given by $$f_1 = \frac{1}{2\pi} \sqrt{\frac{EI_y}{PAr^4}} \sqrt{\frac{n^2(n^2-1)}{N^2 + 2(1+V)\frac{I_y}{I_p}}}$$

where
V: Poisson's ratio
Ip: sectional secondary polar moment

As described above, where the electrostrictive elements are arranged in the prior art manner as shown in FIG. 8(A), the condition for generating the bending vibration in the ring plane may be satisfied by applying to the electrostrictive element the periodic voltage of the frequency which generates the in-plane vibration. However, in the arrangement of the electrostrictive element shown in FIG. 8(A), the amplitude of the in-plane vibration cannot be increased and the in-plane vibration is difficult to generate.

Figure 10:
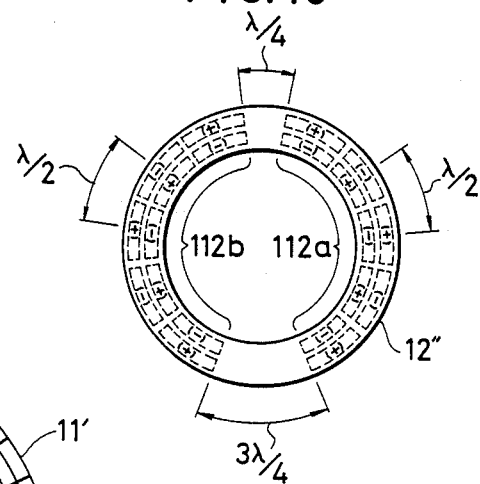
FIG. 10 is a plan view showing arrangement of the electrostrictive elements suitable to facilitate the generation of the bending vibration in the ring plane and increase the amplitude thereof.

In FIG. 10, an embodiment showing the arrangement of the electrostrictive elements which is easy to generate the in-plane vibration and can increase the amplitude of the in-plane vibration, now will be explained. Electrostrictive elements 12" are arranged in two lines, inner and outer circumferences of the ring, at a constant pitch and in phase. Adjacent areas of the inner and outer circumferences are polarized in opposite polarities.

Thus, when the outer electrostrictive element expands longitudinally, the inner electrostrictive element shrinks, and when the outer electrostrictive element shrinks, the inner electrostrictive element expands so that the in-plane vibration is easy to generate and the amplitude of the vibration increases.

In the present specification, the term electrostrictive element is used to represent an electromechanical transducer. It also includes a piezoelectric element.

In accordance with the embodiments shown in FIGS. 6–8, the twist component of the off-plane vibration of the vibration member is utilized to drive the movable member so that the vibration wave motor can be driven with a high efficiency.

In accordance with the embodiments shown in FIGS. 9 and 10, the electrostrictive elements are arranged to facilitate the generation of the in-plane bending vibration and increase the amplitude thereof.

What is claimed is:

1. A vibration wave motor comprising:
   a vibration member having first and second electrostrictive elements arranged with a phase difference therebetween;
   said electrostrictive elements being arranged in a plurality of parallel lines with adjacent electrostrictive cells of said electrostrictive elements in the parallel lines being polarized in opposite polarities;
   voltage supply means for supplying to said electrostrictive elements a periodic voltage at a frequency to generate a flexural vibration in said vibration member; and
   a movable member in oblique contact with said vibration member adapted to be driven by the flexural vibration generated in said vibration member.

2. A vibration wave motor according to claim 1 wherein said vibration member and said movable member are of ring shape.

3. A vibration wave motor according to claim 1 wherein said electrostrictive elements comprise a plurality of piezoelectric elements.

4. A vibration wave motor comprising:
   a vibration member having first and second electrostrictive elements arranged with a phase difference therebetween;
   said electrostrictive elements being arranged in a plurality of parallel lines with adjacent electrostrictive cells of said electrostrictive elements in the parallel lines being polarized in opposite polarities;
   voltage supply means for supplying a period voltage to said electrostrictive elements at a frequency to generate an in-plane vibration in said vibration member; and
   a movable member adapted to be driven by the in-plane vibration generated in said vibration member, wherein said vibration member and said movable member are ring-shaped, said electrostrictive elements are arranged on an upper or lower surface of said ring-shaped vibration member, and said ring-shaped movable member contacts either an inner or outer circumference of said vibration member.

5. A vibration wave motor comprising:
   a vibration member;
   first electrostrictive means arranged on a surface of said vibration member;
   second electrostrictive means arranged on the surface on which said first electrostrictive means is arranged, said first and second electrostrictive means being arranged in parallel with each other, and being arranged at positions which are shifted in phase relative to each other; and
   apply means for applying periodic signals having different phases with respect to each other to said first and second electrostrictive means, wherein said vibration wave motor outputs a vibration wave generated in said vibration member as a driving force.

6. A vibration wave motor according to claim 5, wherein said vibration member is ring-shaped, and said first and second electrostrictive means are ring-shaped and arranged in parallel with each other on said ring-shaped vibration member so that circles defined by said first and second electrostrictive means have a common center.

7. A vibration wave motor according to claim 5, wherein said first and second electrostrictive means comprise a plurality of piezoelectric elements.

8. A vibration wave motor comprising:
a vibration member having first and second electrostrictive elements arranged with a phase difference therebetween;
said electrostrictive elements being arranged in a plurality of parallel lines with adjacent electrostrictive cells of said electrostrictive elements in the parallel lines having opposite polarities; and
voltage supply means for supplying to said electrostrictive elements a periodic voltage at a frequency to generate a travelling vibration wave in said vibration member, wherein said vibration wave motor outputs a vibration wave generated in said vibration member as a driving force.

9. A vibration wave motor according to claim 8, wherein said electrostrictive elements comprise piezo-electric elements.

10. A vibration wave motor comprising:
a vibration member;
a plurality of first electrostrictive element portions arranged in a parallel line on said vibration member, said first electrostrictive element portions being divided into a plurality of parts, each of said parts being oppositely polarized relative to each other, and each part in each portion being parallel with each other and being arranged with opposite polarities;
a plurality of second electrostrictive element portions arranged in a parallel line on said vibration member, said second electrostrictive element portions being divided into a plurality of parts, each of said part being oppositely polarized relative to each other, and each part in each portion being parallel with each other being arranged with opposite polarities, said first and second electrostrictive element portions being arranged with a phase difference therebetween; and
applying means for applying periodic signal to said first and second electrostrictive element portions, said vibration wave motor outputting vibration wave generated in said vibration member as a driving force.

11. A vibration wave motor according to claim 10, wherein said electrostrictive elements portions are piezo-electric members.

* * * * *

UNITED STATES PATENT AND TRADEMARK OFFICE
CERTIFICATE OF CORRECTION

PATENT NO. : 4,831,305
DATED : May 16, 1989
INVENTOR(S) : Mukohjima et al.

Page 1 of 2

It is certified that error appears in the above-identified patent and that said Letters Patent is hereby corrected as shown below:

On the title page:

[56] ASSISTANT EXAMINER:

Change "Emanuel Todd" to --Emanuel Todd Voeltz--.

COLUMN 1:

Line 31, change "A.C. power" to --an A.C. power--; and

Line 64, change "A;...at" to --A',...at--.

COLUMN 4:

Line 20, change "element 5" to --elements--.

COLUMN 5:

Line 10, change "by" to --the--.

COLUMN 6:

Line 43, change "period voltage" to --periodic voltage--.

UNITED STATES PATENT AND TRADEMARK OFFICE
CERTIFICATE OF CORRECTION

PATENT NO. : 4,831,305

DATED : May 16, 1989

INVENTOR(S) : Mukohjima, et al

It is certified that error appears in the above-identified patent and that said Letters Patent is hereby corrected as shown below:

Column 8, line 18, change "part" to --parts--.

Signed and Sealed this

Thirty-first Day of July, 1990

*Attest:*

HARRY F. MANBECK, JR.

*Attesting Officer*  *Commissioner of Patents and Trademarks*